Patented Oct. 16, 1951

2,571,134

UNITED STATES PATENT OFFICE 2,571,134

PRODUCT AND PREPARATION OF PERICLASE

James C. Hicks, Menlo Park, and Leslie W. Austin, San Jose, Calif., assignors to Kaiser Aluminum & Chemical Corporation, a corporation of Delaware No Drawing. Application July 13, 1949, Serial No. 104,582

30 Claims. (Cl. 106—59)

This invention relates to the production of magnesia refractories and refractory materials, and specifically it relates to the production of large, dense pieces of crystalline magnesium oxide of such size and shape as may be desired.

In the past it has been known that magnesium oxide of high purity is highly refractory, having a melting point of up to 2800° C. However, it has been very difficult to prepare high purity magnesium oxide materials for refractory purposes. In order to provide such materials of high density, it has been thought necessary to fuse the oxide, which is a very difficult and expensive operation. The alternative to fusion was to sinter magnesia-yielding materials at very high temperatures of the order of 2000° C. Such sintering, if applied to magnesium hydroxide or magnesium carbonate, for example, resulted in great shrinkage and cracking of the magnesia and the production of relatively brittle and weak pieces which were suitable only for the production of grains of fine particle size. When, on the other hand, magnesia which had been calcined to remove the shrinkage was formed and fired to high temperature the resulting pieces or grains had a relatively high porosity, which is undesirable in a refractory material which must resist penetration and attack by vapors or slags or which must resist deformation under load at high temperatures. High porosity is also undesirable in refractory pieces which are to be used as heat exchange media, since the heat capacity and rate of thermal conductivity of the material are reduced thereby. It is obviously undesirable to add to the magnesia fluxes which will result in lower porosity upon firing, since such materials greatly lower the refractoriness, decrease resistance to spalling and chemical attack, and promote the fusion or cohesion of grains such as heat-exchange media into a more or less solid mass which may preclude satisfactory operation of a heat exchanger, for example.

There is need for an economical process which will provide well-crystallized non-fused magnesia grains of high purity, high density and controllable grain size. There is further need for an economical process which will provide magnesia heat exchange media which are characterized by refractoriness, high density, high heat capacity and high thermal conductivity, and which can be prepared readily in predetermined size and shape.

According to the present invention, a highly crystallized periclase product is obtained by burning a magnesia-yielding material in admixture with at least one material chosen from the group consisting of chromium and chromium compounds, employing a two-stage firing operation. In the initial firing or calcining stage a magnesium compound is employed which upon firing yields magnesia analysing over 95% MgO, and not over 2% $SiO_2$ and not over 2% CaO. The initial calcining stage is carried out under conditions such that a product is obtained containing magnesia which is in an active state, that is, which is crypto-crystalline, is readily re-crystallized, and is capable of shrinking upon further heat treatment. For example, this calcined magnesia product, when containing up to 2.0% $Cr_2O_3$, in pulverized form passing a 200-mesh screen, has a maximum bulk density of not more than 1.5 gms. per cc. when compacted under its own weight by tapping. The chromium material added is finely divided or is in solution and is intimately admixed with the magnesia or magnesium compound either before or after the calcining operation. The mixture of magnesia and chromium compound is pressed into shapes and fired in the second firing operation at a temperature of at least 1300° C. and preferably of at least 1600° C. to form well-crystallized, dense magnesia material or periclase.

The magnesium compounds useful as starting materials in the invention include any which upon firing yield magnesia of the purity stated above. These include, for example, precipitated or natural magnesium hydroxide, magnesium carbonate or magnesium basic carbonate, magnesium alcoholate, magnesium sulfate, magnesium chloride, and the like. Cryptocrystalline magnesium oxide of the stated purity can be used as a starting material provided it is in an active state and capable of further shrinking upon heat treating. When precipitated magnesium compounds are employed, they are usually readily obtainable in finely divided form and in the form of a suspension in a liquid, which is usually water. Under these circumstances it is more convenient and usually advantageous to add the catalytic chromium compound to the magnesia-yielding material at this point, preferably adding it as a solution. When natural ores such as magnesite for example, are employed as the starting material it is more convenient and advantageous to calcine the magnesia-yielding material to form magnesia of the desired activity first, before the addition of the chromium compound. This procedure makes it possible to prepare the magnesia in an extremely finely divided form which is especially adapted to be acted upon by the catalytic chromium compound. In certain cases it is advantageous to employ the second procedure with precipitated magnesium compounds, also. Mixtures of the magnesia materials can be employed.

The chromium compounds useful as a crystallization catalyst in the invention include for example chromic acid, magnesium chromate and dichromate, ammonium chromate and dichromate, chromium sulfate, chromium chloride, chromium nitrate, chromium acetate, and chromates and dichromates of the alkali metals, the chromates and dichromates of the alkaline earth metals, chromite, and chromic oxide. Finely divided chromium metal can be added when the firing takes place under conditions which bring about its oxidation at about 1200° C. or below, as in the presence of water vapor at a red heat for example. In many cases it is preferable to use a soluble chromium compound because of the greater ease of dispersing the chrome in the magnesium compound when in solution. Mixtures of such additives can be employed.

The chromium or chromium compound is added in an amount which will provide up to about 39% by weight of chromium calculated as $Cr_2O_3$ in the fired product. In many cases it is preferable to add up to about 2.0% chromium calculated as $Cr_2O_3$, as within this range the chromium appears to be present in solid solution and apparently has a catalytic effect on the crystallization of the periclase. Above about 2.0%, improvement in crystallization of the periclase is also obtained, as measured by decrease in porosity and increase in density, but a color change is noted, the periclase crystals becoming more brownish. With increasing amounts of the chromium material, chrome-magnesia spinel, magnesiochromite, appears to crystallize out separately upon firing. However, when up to about 10% of chromium material, calculated as $Cr_2O_3$, is added the periclase crystal mass is substantially uniformly brownish in color. Above this amount the brownish color of the periclase crystals appears to decrease in depth of tint and appreciable amounts of crystals having other characteristics begin to appear. When the chromium material added is chromite, it is added in an amount to provide up to about 22.0% chromium as $Cr_2O_3$, where the chrome content of the ore is at a maximum, for example, about 55%; with lower grade ores the amount added is less. For example, where the ore contains 30%–33% chromium oxide, the remainder being principally alumina, iron oxide, lime and silica, up to about 14% is added. It is noted with such additions of chromite, that the crystal mass produced is rather uniform as to size and shape of crystals, but that above this range the periclase crystals appear lighter in color and that there are also present crystals, perhaps mixed spinels but not presently completely identified, which have a faint pinkish tint under crossed nicols. In all cases, the crystal mass, or grain material, contains a major proportion, that is, more than 50%, of periclase crystals. In order to burn the material to the desired dense, tough, refractory product, more than 50% of periclase must be present.

The chromium compounds useful in this invention are preferably added in thorough and intimate admixture with the magnesia-yielding compound. This is advantageously effected by adding the chrome compound in solution. Water is a preferred solvent for the chrome compound but any other solvent therefor can be used. For instance, chromic sulfate in one form is more soluble in alcohol than in water, and in such case alcohol can be employed as the solvent, or liquid dispersing medium. The magnesia or magnesium compound starting material is preferably in finely divided form.

Prior to the second or periclase firing stage it is sometimes advantageous to admix with the active calcined magnesia and chromium compound an amount of well-crystallized periclase, or magnesia, material in finely divided form. Such finely divided periclase material serves to minimize shrinkage during the final firing stage without unfavorably affecting the porosity of the finished product. The fine periclase is preferably of the same purity as is stated above for the active magnesia. It is prepared by firing at a temperature of at least 1300° C. and preferably of at least 1600° C. The higher degrees of firing appear to be advantageous, and fused magnesia may be employed with excellent results. In making material of the highest density the periclase is employed as a very fine powder, preferably substantially all finer than 74 microns in diameter and with a major proportion, i. e., at least 50%, finer than 44 microns. It is desirable to have a substantial proportion, for example at least 10% and preferably at least 50%, of the periclase finer than 10 microns in diameter. In fact it has been found possible to control the density and porosity of the product within wide limits by employing various coarser sizes of periclase in this step. By restricting the periclase added in this step to substantially all finer than 74 microns it has been possible to produce shaped products having only about half of the porosity of products embodying a similar proportion of periclase but in the grain sizing commonly employed in the art for the production of dense bodies. As desired, the periclase can be added to the magnesia mixture in any amount up to about 90% of the mix, and a dense, well-crystallized magnesia product is obtained by pressing into shapes and firing to high temperatures. Preferably, the mix is fired at a temperature of more than 1600° C. The presence of the fine periclase decreases the amount of shrinkage in the magnesia material upon firing.

In another embodiment of the invention cryptocrystalline magnesia is blended with a magnesia-yielding compound or compounds prior to the final firing step. To this end, for example, a precipitated magnesium compound which upon firing yields magnesium oxide is blended with sufficient chromium compound to provide not over about 39% $Cr_2O_3$ in the final fired analysis, and part of the mixture is calcined to yield an active, cryptocrystalline magnesia. In a rotary kiln, for example, this calcination may be performed at temperatures between about 850° C. and 1300° C. in the normal time of residence in such kilns, for example, about one-half hour. The resulting magnesia is pulverized and is then blended with sufficient of the remaining uncalcined mixture above, in the form of a water suspension, to form a stiff mud. The stiff mud is shaped with moderate pressure and is then dried and fired to at least 1300° C. and preferably above about 1600° C. to form well-crystallized periclase. Alternatively, the cryptocrystalline magnesia may be blended with dry magnesium hydroxide and the mixture formed into shapes under pressure prior to the firing step. In another variation the cryptocrystalline magnesia is blended with the slurry of precipitated magnesia-yielding compound and the mixture is fed directly to a rotary kiln where it is fired to form periclase. In any of these embodiments, prior to the firing step it is advantageous to mix with the magnesia and magnesia-yielding compound a solution of magnesium chromate, chromic acid, or an acid salt of chromic acid which reacts with the magnesium compounds to form magnesium chromate. The magnesium chromate apparently combines with the magnesia to form magnesium oxychromate which provides a binder for the composition, and good strengths are provided for the formed pieces both in the cold and at all stages during the firing. The result is that breakage during handling and firing is minimized, and the kiln product is preponderantly in coarse sizes.

It is an advantage of the present invention that uniform, well-crystallized, magnesia grains of high purity and density, which are especially tough and resistant to impact and which are of controllable size and shape can be produced by firing at temperatures of from about 1600° C. to 1800° C., which may be achieved readily in a rotary kiln, and which are about 400° C. lower than the art has considered necessary for materials of comparable purity. The process furthermore provides an excellent means for the production of dense, highly refractory magnesia heat-exchange media of controllable size and shape, since the high-density material is formed with only moderate shrinkage during the firing.

A further advantage of the invention is that it provides means for the re-use of periclase refractories, heat-exchange media and the like when these materials are of the desired purity. Magnesia refractory materials are often actually improved chemically in service in certain applications, but they tend to granulate, spall, or otherwise break down physically under long continued heating. Such materials can be finely ground and used advantageously as the periclase filler as outlined above and the material is thereby reconstituted to have properties similar or superior to the original.

The present invention has advantage over the direct firing of magnesia-yielding materials of the desired purity since the latter process results in great shrinkage during the firing, which is accompanied by much cracking and precludes the formation of sound strong grains in any but small sizes. The invention has advantage over the pressing and firing of well-crystallized magnesia by itself, since the porosity of the material produced by the invention is much lower than can be obtained in a material produced solely from well-crystallized magnesia.

The following table illustrates the improvement in porosity in the grain material produced according to the invention and shows that it is essential that the initial calcination be carried out below the temperature at which substantially complete shrinkage of the magnesia has taken place. Precipitated magnesium hydroxide obtained by treating sea water with calcined dolomite to precipitate $Mg(OH)_2$, and then settling and washing the precipitate, was used as the magnesia source for the tests shown in the table, and sufficient chromic acid, $CrO_3$, was admixed with the magnesium hydroxide slurry before calcining to give an analysis of ¼% $CrO_3$ in the fired product. In the preparation of the samples the magnesia was formed by calcining at the indicated temperature for one-half hour, to give a bulk density, as measured on the powder passing 200 mesh, as shown, then the magnesia was pressed into cylindrical shapes approximately 2″ in diameter by 2″ high under a load of 6360 pounds per square inch. The briquettes were then fired at 1700° C. for ½ hour, and during the second firing the magnesia recrystallized to form a periclase refractory material having porosities as shown.

*Table*

| Temp. of Calcination of the Magnesia | Bulk Density Calcined Magnesia gms./cc. | Porosity after Pressing and firing at 1700° C. |
| --- | --- | --- |
| °C. | | |
| 450 | 0.265 | 7.9 |
| 550 | 0.260 | 6.1 |
| 650 | 0.242 | 5.4 |
| 750 | 0.239 | 5.4 |
| 835 | 0.227 | 5.4 |
| 950 | 0.286 | 4.75 |
| 1,050 | 0.738 | 7.3 |
| 1,110 | 0.863 | 9.1 |
| 1,150 | 1.234 | 8.5 |
| 1,200 | 1.412 | 13.5 |
| 1,300 | 1.757 | 17.2 |
| 1,600 | 1.70 | 18.2 |

In all cases below the 1300° C. calcination temperature the use of the small amount of chromium compound as a catalyst results in lower porosities than are obtained when the chromium is omitted but the treatment is otherwise the same; and the magnesia so obtained is cryptocrystalline and is capable of further shrinkage. Preferably, the starting material is calcined at not over about 1200° C. and for not over about 45 minutes. Longer firing at lower temperature or shorter firing at a higher temperature can produce a comparable cryptocrystalline product, and for this reason the desired type of magnesia is characterized by the bulk density. The maximum bulk density for the magnesia containing up to 2.0% $Cr_2O_3$ produced by the calcining step is preferably from about 0.5 to 1.5 gms. per cc. when of a particle size substantially all less than 200 mesh (74 microns), and compacted under its own weight by tapping the container until continued tapping produces no further decrease in volume of the powder. When higher amounts of chromium material are added, the bulk density is somewhat higher, but the material is calcined in the first stage to a cryptocrystalline state, preferably for the same time and at the same temperature.

The magnesia source or the magnesia, as the case may be, is preferably very finely divided prior to admixture of the chromium compound to insure the most intimate interdispersion possible. Fine division of the chrome and magnesia mixture just prior to the pressing stage is helpful when employing the denser magnesias, for example those having bulk densities over about 0.3 gm./cc. However, the more lightly burned magnesias may be used in coarser or even granular form, since their structures are so weak that the forming procedure or pressure breaks the particles down and forms very compact shapes from even the larger pieces.

The lightly burned magnesias tend to be sticky and for this reason more difficult to press into shapes, and it is sometimes desirable to use a blend of magnesias. For example, 75% of magnesia calcined to 1150° C. and having a bulk density of 1.284 gm./cc. is thoroughly mixed with 25% of magnesia calcined to 835° C. and having a bulk density of 0.227 gm./cc., both magnesias being very finely powdered. The mixture is then pressed into shape at 8,000 pounds per square inch and fired at 1600° C. or higher to make a dense, low porosity periclase material. When very fine periclase as above described is used as a filler in the batch, higher proportions of the periclase are employed in admixture with calcined magnesia of lower bulk density and lower proportions of periclase with calcined magnesia of higher bulk density, and it is found that the pressing characteristics of the mixtures are also thereby improved.

In carrying out the invention to prepare periclase material of the greatest density it is sometimes desirable to mix and press the product of the first calcination step as promptly as possible. The initial calcination provides an active magnesia whose minute magnesium oxide crystal surfaces are substantially free from films of impurities or from adsorbed vapors, gases or ions, and are consequently in an especially favorable state to coalesce together into larger crystals in the second or recrystallization firing step. Forming into shapes under pressure then brings these minute crystals very close together and aids the recrystallization. In order to minimize adsorption, or hydration, or carbonation of the active magnesia it appears advantageous to pulverize, mix, and press the magnesia calcine while it is hot, and then fire the shapes immediately, and by this means very low porosities are obtained.

However, for convenience in handling and pressing, it is usually desirable to employ a small amount of tempering liquid in the magnesia mixture prepared for pressing. Depending upon the activity of the magnesia, from about 2% to about 15% of liquid is used. Although in general somewhat higher density products are obtained when the magnesia is pressed dry, very satisfactory results are obtained when tempering liquid is used. The use of a tempering liquid allows the incorporation of a binder, to provide additional strength during handling and firing of the briquettes. Such binder should consist of materials which upon firing are either driven off or break down to form magnesium oxide or refractory oxides which are not deleterious to the properties of the product as, for example, magnesium chloride or magnesium sulfate. An especially advantageous binder comprises magnesium chromate or compounds which react with magnesia to form magnesium chromate. In the presence of magnesia, magnesium chromate appears to form a magnesium-oxychromate cement which is quite strong in the cold and which provides exceptional strength during the intermediate ranges of the firing when many other cements would have been decomposed. To this end, during the forming operation in the process of the invention, prior to the firing step it is often advantageous to temper the batch with a solution of magnesium chromate. This can be effected by adding a solution of the salt, or a solution of chromic acid or an acid salt of chromic acid which upon addition reacts with the magnesia to form magnesium chromate. The amount added can preferably be from that sufficient to add ⅛% $Cr_2O_3$ up to that sufficient to provide a total of about 10%, as $Cr_2O_3$, in the fired analysis; or, if a catalytic effect is desired, up to 2.0% as $Cr_2O_3$. After blending the chrome-bearing solution with the magnesia it is desirable to press the material promptly, as the cement hardens within a few hours.

The following examples are given to illustrate more clearly the process of the invention as applied to specific embodiments.

Example 1

Magnesium hydroxide is formed by reacting sea water and calcined dolomite, followed by countercurrent washing with fresh water to free the precipitate of impurities. The resulting slurry comprises a suspension of minute $Mg(OH)_2$ crystals, which upon ignition have the following analysis:

| | Per cent by weight |
|---|---|
| $SiO_2$ | 1.05 |
| CaO | 1.20 |
| $Al_2O_3$ | 0.17 |
| $Fe_2O_3$ | 0.30 |
| MgO | [1] 97.28 |
| Loss on ignition | 31.55 |

[1] By difference.

Sufficient chromic acid, $CrO_3$, is mixed with the slurry to yield ¼% $Cr_2O_3$ in the fired analysis, and the mixture is dried and calcined at 850° C. for one-half hour. The calcined magnesia is then briquetted under a pressure of at least 4000 p. s. i. and the shaped pieces are fired at 1700° C. for one-half hour. The resulting periclase material has a porosity of 5.4% and is hard, dense, and well-crystallized.

Example 2

Magnesium hydroxide slurry of the composition as given in Example 1 is filtered, dried and calcined at 1000° C. for one hour. The calcined magnesia is pulverized and made into a slurry in ethyl alcohol. Chromic chloride is dissolved in the alcohol and a sufficient amount of the solution is added to the magnesia slurry to give an analysis in the fired product of ¼% $Cr_2O_3$. The alcohol is recovered by distillation, and the magnesia cake is pressed into cylindrical pellets at 8000 p. s. i. The pellets are fired to 1740° C., and the resulting well-crystallized periclase material has a porosity of 8.5%.

Instead of ethyl alcohol, any other liquid alcohol, or mixtures of liquid alcohols can be employed in making the slurry and the chromium compound solution can be prepared with other alcohol or mixtures of alcohols in which the compound is soluble.

Example 3

Magnesium hydroxide is prepared by reacting a magnesium chloride-bearing brine with calcined dolomite. The precipitate is washed to remove soluble salts, and it then has the following analysis upon the ignited basis:

| | Per cent by weight |
|---|---|
| $SiO_2$ | 1.11 |
| CaO | 1.72 |
| $Al_2O_3$ | 0.33 |
| $Fe_2O_3$ | 0.27 |
| MgO | [1] 96.57 |

[1] By difference.

Sufficient chromic acid solution is admixed with the magnesium hydroxide slurry to yield ½% $Cr_2O_3$ in the fired analysis, and the mixture is dried and calcined to 950° C. The calcine is pulverized, tempered with 5% water and pressed into shapes at about 6000 p. s. i. The shapes are then fired to about 1500° C. and the porosity of the resulting periclase material is found to be 11.1%. After firing to 1700° C. the porosity is 10.8%, and the grain is hard and dense.

Example 4

Magnesium carbonate is prepared by carbonating a precipitated magnesium hydroxide slurry similar to those described in the previous examples with gases rich in $CO_2$. The soluble magnesium bi-carbonate is formed, from which solution the suspended solids high in impurities are filtered or classified. The solution is then boiled to expel excess $CO_2$, and a finely divided magnesium carbonate is precipitated. On the ignited basis this material has the following analysis:

|  | Per cent by weight |
|---|---|
| $SiO_2$ | 0.46 |
| CaO | 1.39 |
| $Al_2O_3$ | 0.17 |
| $Fe_2O_3$ | 0.12 |
| MgO | [1] 97.86 |

[1] By difference.

To the slurry of magnesium carbonate is added sufficient chromic acid to give ¼% $Cr_2O_3$ in the fired analysis, and the mixture is dried and fired to 800° C. for two hours. The calcined magnesia is then powdered, blended with a tempering amount of water, and pressed into shapes at about 8000 p. s. i. After firing the shapes to 1700° C. for ½ hour, the resulting periclase material has a porosity of 5.07%.

*Example 5*

Magnesium carbonate prepared as in Example 4 is calcined to form a caustic magnesium oxide of low activity, and the magnesia is powdered and blended with sufficient sodium dichromate to yield ½% $Cr_2O_3$ in the fired analysis. The mixture is pressed at a pressure in excess of 4000 p. s. i., and the pressed pieces are fired at 1885° C. for three hours. The resulting well-crystallized periclase has a porosity of 7.4%.

*Example 6*

Excellent heat exchange media are prepared by admixing magnesium hydroxide slurry prepared as in Example 1 with sufficient sodium dichromate solution to provide ¼% $Cr_2O_3$ in the analysis of the fired material, and calcining the mixture to approximately 1100° C. for about ½ hour in a rotary kiln to form an active magnesia. The active magnesia is pulverized so that it is substantially all finer than 325-mesh (44 microns) and in this form has a bulk density of about 1.0 gram per cc. when compacted by tapping.

Highly sintered and well-crystallized magnesia containing more than 95% MgO and less than 2% CaO and less than 2% $SiO_2$ is powdered to pass a 200-mesh screen. Eighty parts by weight of the crystallized magnesia, 18 parts by weight of the active magnesia, and 2 parts by weight of powdered magnesium chromate are intimately blended together and the mixture is tempered with about 8 parts by weight of water. The mix is then pressed into the desired heat exchange shapes at a pressure of approximately 10,000 pounds per square inch, and the shapes are dried, and three portions of these shapes are fired to different temperatures, in each case in excess of 1300° C. After firing one portion to 1400° C. for one-half hour, the shapes are found to have a bulk density of 3.05 gms. per cc., and a porosity of 14%. After firing the second portion to 1700° C. for one-half hour, the bulk density is about 3.18 gms. per cc., and the porosity is 11.0%. After firing the third portion to 2100° C. for several hours the bulk density is about 3.5 gms. per cc. and the porosity is about 2.0%.

*Example 7*

A natural magnesite, exhibiting on the ignited basis an analysis as follows: 0.32% $SiO_2$, 1.43% $R_2O_3$ (1.18% $Fe_2O_3$ and 0.25% $Al_2O_3$), 0.25% CaO and 97.0% MgO (by difference), is ball milled for 1.5 hours, and the powder is then calcined at 800° C. for one hour. With the calcined, fine powder is admixed 0.5% by weight of $CrO_3$, the two components are thoroughly milled together, and there is then added, with thorough blending, 5% water. The mixture is now pressed into pellets under a pressure of 8000 lbs. per sq. in., and the pressed pellets are fired at 1700° C. for one-half hour. The grain obtained has a porosity of 15.0% and is hard and dense.

*Example 8*

Magnesium hydroxide filter cake of composition similar to that in Example I and containing 32.4% MgO is blended with refractory grade chromite ore which has been ground to pass a 200-mesh screen (74 micron opening), and which contains about 33% $Cr_2O_3$. Six parts by weight of the magnesium hydroxide are blended into two parts of water and 1.5 parts of the finely ground chromite to yield a thick slurry in which the magnesium hydroxide and chromite are uniformly interdispersed. The slurry is then dried and calcined at about 1100° C. for about one-half hour. The calcine is ball milled to pass a 200-mesh screen, and the resulting powder is pressed, dry, into cylindrical shapes at about 8000 pounds per square inch. These briquettes are then fired at 1700° C. for one-half hour. The resulting refractory material consists preponderantly of well-crystallized periclase, analysing about 14.2% $Cr_2O_3$, and having a porosity of about 10.1%. The grains produced by crushing this material are hard, tough, and angular.

*Example 9*

Magnesium hydroxide slurry, having a composition similar to that of Example 1 and containing about 23% MgO, is uniformly mixed with sufficient chromic acid, $CrO_3$, to provide ¼% $Cr_2O_3$ in the magnesia produced by firing. A portion of the treated slurry is dried and calcined at about 1200° C. for about one-half hour. The calcine is powdered to pass substantially a 200-mesh screen, and the powder is found to have a bulk density of about 1.4 gms. per cc. Three parts of the powdered calcine are then blended in a pug mill with two parts of another portion of the same chromic acid-treated magnesium hydroxide slurry to yield a stiff mud which is extruded through a die in the form of rods or ribbons which are cut or broken into approximately equidimensional pieces. These pieces are dried and are then fired in a rotary kiln to about 1700° C. The resulting grain material is in large, tough pieces and has a porosity of about 14%. The pieces have increased strength in the intermediate states of firing and consequently do not break up excessively in going through the kiln.

In the operation of the process of this invention, a final fired product is obtained which exhibits not only a high density in itself but also less shrinkage when it is employed as grain material, for example, in making further shaped products. Also, a product of desired and controlled grain size can be thus prepared because the calcined mixture is fired in pressed shapes which hold together well during the firing step, so that the final fired product is in as large pieces as desired. The cryptocrystalline product obtained by the calcining step may be mixture of cryptocrystalline magnesia and chromium oxide or other chromium compound as first admixed; or it may be a mixture of such magnesia and a reaction product of the chromium or chromium compound, formed during the mixing; or a reaction may occur during the calcining step to produce a mixture of a chromium compound and such magnesia. In any case it is believed that the product of the calcining step is suitably expressed as a cryptocrystalline magnesia-containing product or material, whether it comprises a mixture of such magnesia with the chromium starting material, or with a reaction product obtained from such chromium starting material. Alternatively, as shown above, a cryptocrystalline magnesia can be admixed with the $Cr_2O_3$-providing material, pressed and fired. The calcined product can be pressed and fired, and this is often advantageous, as, particularly where it contains magnesium oxychromate as a binder, after pressing it coheres better during the firing step to produce an especially dense, low-porosity well-crystallized periclase. Alternatively, however, the cryptocrystalline magnesia, or magnesia-containing product, can be mixed with a slurry of magnesia-yielding material, preferably also with magnesium chromate, and the mixture fired directly, as further described above. Where pressure is employed in forming prior to firing, it is preferred to employ a pressure of at least 3000 lbs. per sq. in.

In conformity with common practice in reporting chemical analyses of refractory materials, in the specification and claims the proportions of the various chemical constituents present in a material are given as though these constituents were present as the simple oxides. Thus, the magnesium constituent is referred to as magnesium oxide or MgO, the chromium constituent as $Cr_2O_3$, the silicon constituent as $SiO_2$, and so on for other elements reported, although the silica or chrome and a very small proportion of the MgO, for example, may be present in combination with each other or with another minor constituent. For example, the term "2.0% by weight $Cr_2O_3$, or by weight of chromium as, $Cr_2O_3$" is intended to mean that a chemical analysis of the material referred to would show the chromium content as 2.0% expressed as $Cr_2O_3$, although in reality all of the chromium might be present in the form of magnesium chromite or in some other combined form.

Having now described the invention, what is claimed is:

1. Process of preparing well-crystallized periclase material which comprises admixing a magnesium compound which will form periclase upon firing and at least one material chosen from the group consisting of chromium and compounds of chromium, said chromium material being added in an amount to provide in the product up to about 10.0% $Cr_2O_3$, based on the total weight of the fired product, calcining the admixture to obtain a cryptocrystalline product, pressing, and firing said pressed material to a temperature of at least 1600° C.

2. Process as in claim 1 wherein said magnesium compound is magnesium hydroxide.

3. Process as in claim 1 wherein said magnesium compound is magnesium carbonate.

4. Process of preparing well-crystallized periclase material which comprises admixing a magnesium compound which will form periclase upon firing, at least one material chosen from the group consisting of chromium and compounds of chromium, said chromium material being added in an amount to provide in the product up to about 10.0% $Cr_2O_3$, based on the total weight of the fired product, and a tempering amount of water, calcining the admixture to obtain a cryptocrystalline product, pressing, and firing to a temperature of at least 1600° C.

5. Process as in claim 4 wherein with said calcined admixture is mixed up to 90% by weight of finely divided well-crystallized periclase.

6. Process of preparing well-crystallized periclase which comprises admixing a magnesium compound which will form periclase upon firing, at least one material chosen from the group consisting of chromium and compounds of chromium, said chromium material being added in an amount to provide in the product up to 2.0% $Cr_2O_3$, based on the total weight of the fired product, calcining the admixture to obtain a product having a bulk density of not more than 1.5 gms. per cc. when of a particle size substantially all less than 74 microns diameter, pressing and firing to a temperature of at least 1600° C.

7. Process as in claim 5 wherein said mixture is calcined at not over 1200° C. for not over about 45 minutes.

8. Process of preparing well-crystallized periclase material which comprises calcining a magnesium compound, which will form periclase upon firing, to obtain magnesia having a bulk density of not more than 1.5 gms. per cc. when of a particle size substantially all less than 74 microns diameter, admixing said magnesia and at least one material chosen from the group consisting of chromium and compounds of chromium, said chromium material being added in an amount to provide up to about 10.0% $Cr_2O_3$ in the fired product, based on the total weight of the fired product, pressing, and firing said pressed mixture at a temperature of at least 1600° C.

9. Process as in claim 8 wherein said mixture is pressed while hot.

10. Process as in claim 8 wherein said chromium material is added in an amount to provide up to 2.0% $Cr_2O_3$ in the fired mixture.

11. In the process of preparing a well-crystallized periclase material, the steps which comprise preparing an admixture of a product which contains cryptocrystalline magnesia and up to about 39.0%, calculated as $Cr_2O_3$ in the fired product, of at least one chromium material chosen from the group consisting of chromium and chromium compounds, and firing said admixture at a temperature of at least 1300° C. to form well-crystallized periclase.

12. In the process of preparing a well-crystallized periclase material, the steps which comprise pressing an admixture of cryptocrystalline magnesia and up to about 39.0%, calculated as $Cr_2O_3$ in the fired product, of at least one substance chosen from the group consisting of chromium and compounds of chromium, and firing at a temperature of at least 1300° C. to form well-crystallized periclase.

13. In the process of preparing well-crystallized periclase material containing up to 10.0% of chromium as $Cr_2O_3$, the steps which comprise admixing a precipitated magnesium compound which will yield magnesia upon firing and at least one chromium material chosen from the group consisting of chromium and chromium compounds, calcining said admixture to form a product which contains cryptocrystalline magnesia, admixing with said calcined product a chromium compound, said chromium material and chromium compound being added in such amounts that the sum thereof will provide a total of up to 10.0% of chromium calculated as $Cr_2O_3$ in the final fired product, pressing said admixture of calcined product and chromium compound, and firing said pressed admixture to form well-crystallized periclase.

14. Process of preparing well-crystallized periclase material which comprises admixing a slurry of precipitated magnesium hydroxide and chromic acid, said chromic acid being admixed in an amount to provide up to about 2.0% $Cr_2O_3$ in the fired product, calcining said admixture to form a cryptocrystalline magnesia-containing product having a bulk density of not more than 1.5 gms. per cc. when of a particle size substantially all less than 74 microns diameter, forming said calcined product into shapes under pressure, and firing at a temperature of about 1700° C. to form well-crystallized periclase.

15. Process as in claim 14 wherein said admixture is calcined at a temperature of about 850° C.

16. Process as in claim 14 wherein chromic acid is added in an amount to provide 0.25% by weight $Cr_2O_3$ based on the total weight of the fired product.

17. Process as in claim 14 wherein said calcined product is pressed while hot.

18. Process of preparing well-crystallized periclase which comprises admixing a slurry of precipitated magnesium carbonate and chromic acid, said chromic acid being added in an amount to provide up to about 2.0% by weight $Cr_2O_3$, based on the total weight of the fired product, drying, calcining said admixture to form a product which contains cryptocrystalline magnesia having a bulk density of not more than 1.5 gms. per cc. when of a particle size substantially all less than 74 microns diameter, comminuting, blending with a tempering amount of water, pressing, and firing said pressed product to form well-crystallized periclase.

19. Process as in claim 18 wherein chromic acid is added in an amount to provide 0.25% by weight $Cr_2O_3$, based on the total weight of the fired product.

20. Process of preparing a well-crystallized periclase material which comprises calcining at least one substance chosen from the group consisting of precipitated magnesium hydroxide and precipitated magnesium carbonate to form cryptocrystalline magnesia having a bulk density of not more than 1.5 gms. per cc. when of a particle size substantially all less than 74 microns diameter, comminuting said magnesia, admixing with said magnesia at least one finely divided substance chosen from the group consisting of chromium and chromium compounds, said finely divided substance being added in an amount to provide up to about 10.0% by weight $Cr_2O_3$, based on the total weight of the fired mass, pressing said admixture, and firing said admixture to form well-crystallized periclase.

21. Process as in claim 20 wherein sodium dichromate is added to said admixture.

22. Process as in claim 20 wherein with said admixture of crypto-crystalline magnesia and said finely divided substance is admixed up to 90% by weight of finely divided well-crystallized periclase.

23. Process of preparing a well-crystallized periclase material which comprises mixing a precipitated magnesium compound which will yield magnesia upon calcining and at least one chromium material chosen from the group consisting of chromium and chromium compounds, said chromium material being added in an amount to provide up to about 10.0% chromium calculated as $Cr_2O_3$ in the fired product, calcining part of said mixture to form a product which contains cryptocrystalline magnesia, admixing said calcined product with the remainder of said mixture, and firing said admixture at a temperature of at least 1600° C. to form well-crystallized periclase.

24. Process as in claim 23 wherein said precipitated magnesium compound is magnesium hydroxide.

25. Process as in claim 23 wherein said remaining mixture is added in the form of a water slurry.

26. Process of preparing a well-crystallized periclase material which comprises mixing a precipitated magnesium compound which will yield magnesia upon calcining and at least one chromium material chosen from the group consisting of chromium and chromium compounds, calcining said mixture to form a product which contains cryptocrystalline magnesia, admixing said calcined product, magnesium chromate and a precipitated magnesium compound which yields magnesia upon calcining, said chromium material and said magnesium chromate being added in such amounts that the sum thereof will provide up to about 10.0% chromium, calculated as $Cr_2O_3$, in the final fired product, and firing said admixture at a temperature of at least 1600° C. to form well-crystallized periclase.

27. In the process of preparing a well-crystallized periclase material, the steps which comprise preparing an admixture of a product which contains cryptocrystalline magnesia and up to about 22%, calculated as $Cr_2O_3$ in the fired product, of finely divided chromite ore, and firing said admixture at a temperature of at least 1600° C. to form a well-crystallized material containing more than 50% of periclase.

28. In the process of preparing a well-crystallized periclase material, the steps which comprise preparing an admixture of a product which contains cryptocrystalline magnesia and up to about 14%, calculated as $Cr_2O_3$, in the fired product, of finely divided chromite ore containing from about 30% to about 33% $Cr_2O_3$, and firing said admixture at a temperature of at least 1600° C. to form a well-crystallized material containing more than 50% of periclase.

29. Dense periclase crystal material of high resistance to impact, having uniformly dispersed in said periclase crystals from about 2.0% to about 10% of chromium material, calculated as $Cr_2O_3$.

30. Dense crystalline periclase material of high resistance to impact, having uniformly dispersed thru said material from about 10% to about 39% of chromium material, calculated as $Cr_2O_3$.

JAMES C. HICKS.
LESLIE W. AUSTIN.

REFERENCES CITED

The following references are of record in the file of this patent:

UNITED STATES PATENTS

| Number | Name | Date |
|---|---|---|
| 2,301,402 | Heuer | Nov. 10, 1942 |
| 2,336,360 | Kleinschmidt et al. | Dec. 7, 1943 |
| 2,487,290 | Austin et al. | Nov. 8, 1949 |